(12) United States Patent
Maloney

(10) Patent No.: US 6,204,764 B1
(45) Date of Patent: Mar. 20, 2001

(54) OBJECT TRACKING SYSTEM WITH NON-CONTACT OBJECT DETECTION AND IDENTIFICATION

(75) Inventor: William C. Maloney, Marietta, GA (US)

(73) Assignee: Key-Trak, Inc., Duluth, GA (US)

( * ) Notice: Subject to any disclaimer, the term of this patent is extended or adjusted under 35 U.S.C. 154(b) by 0 days.

(21) Appl. No.: 09/393,223

(22) Filed: Sep. 9, 1999

Related U.S. Application Data

(60) Provisional application No. 60/099,954, filed on Sep. 11, 1998.

(51) Int. Cl.[7] .................................................. G08B 13/14

(52) U.S. Cl. ..................................... 340/568.1; 340/572.1; 340/572.7; 235/375; 235/385

(58) Field of Search .............................. 340/539, 568.1, 340/571, 572.1, 572.2, 572.4, 572.7, 572.9, 825.34, 825.49, 825.54; 235/375, 383, 385; 705/28, 32

(56) References Cited

U.S. PATENT DOCUMENTS

| | | | |
|---|---|---|---|
| 3,451,043 | 6/1969 | Krause | 235/385 |
| 4,209,787 | 6/1980 | Freeny, Jr. | 342/457 |
| 4,275,385 | 6/1981 | White | 340/825.49 |
| 4,419,734 | 12/1983 | Wolfson et al. | 702/129 |
| 4,519,522 | 5/1985 | McElwee | 221/13 |
| 4,549,170 | 10/1985 | Serres et al. | 340/568.1 |
| 4,575,719 | 3/1986 | Bertagana et al. | 340/825.35 |
| 4,595,922 | 6/1986 | Cobb et al. | 340/825.49 |
| 4,635,053 | 1/1987 | Banks et al. | 340/825.31 |
| 4,636,950 | 1/1987 | Caswell et al. | 705/28 |
| 4,658,357 | 4/1987 | Carroll et al. | 705/32 |
| 4,673,915 | 6/1987 | Cobb | 340/330 |
| 4,737,910 | 4/1988 | Kimbrow | 705/28 |
| 4,796,209 | 1/1989 | Burk | 700/302 |
| 4,814,592 | 3/1989 | Bradt et al. | 235/381 |
| 4,827,395 | 5/1989 | Anders et al. | 700/9 |
| 4,845,492 | 7/1989 | Cobb et al. | 340/825.49 |
| 4,853,692 | 8/1989 | Wolk et al. | 340/573.1 |
| 4,866,661 | 9/1989 | dePrins | 235/382 |
| 4,889,977 | 12/1989 | Haydon | 235/375 |
| 4,926,161 | 5/1990 | Cupp | 340/988 |
| 5,021,778 | 6/1991 | Walton | 340/10.34 |
| 5,038,023 | 8/1991 | Saliga | 235/385 |
| 5,062,151 | 10/1991 | Shipley | 359/154 |
| 5,182,570 | 1/1993 | Nysen et al. | 343/795 |
| 5,218,344 | 6/1993 | Ricketts | 340/573.4 |
| 5,287,414 | 2/1994 | Foster | 382/100 |
| 5,319,544 | 6/1994 | Schmerer et al. | 705/28 |
| 5,335,170 | 8/1994 | Petteruti et al. | 705/28 |
| 5,374,815 | 12/1994 | Waterhouse et al. | 235/383 |
| 5,402,104 | 3/1995 | LaRosa | 340/539 |

(List continued on next page.)

*Primary Examiner*—Van Trieu
(74) *Attorney, Agent, or Firm*—Womble Carlyle Sandridge & Rice

(57) ABSTRACT

An object tracking system is provided for tracking the removal of objects from a location and the replacement of the objects at the location. The system includes a radio frequency identification (RFID) tag attached to each of the objects to be tracked and each tag has an antenna. When activated, the RFID tag of an object transmits a unique code identifying the object. A storage unit is provided at the location and the storage unit has a plurality of receptacles configured to receive objects replaced at the location. Each receptacle has an associated antenna for activating the RFID tag of an object in the receptacle and receiving the radio frequency transmitted code of the object. The antennae of the system can be capacitive plates for conveying the radio frequency transmissions through capacitive coupling or inductive loops for conveying the transmissions through inductive coupling. A computer-based controller is coupled to the antenna of the receptacles for receiving transmitted codes and determining based thereon the absence or presence and location of objects within the storage unit.

31 Claims, 9 Drawing Sheets

U.S. PATENT DOCUMENTS

| | | | |
|---|---|---|---|
| 5,404,384 | 4/1995 | Colburn et al. | 377/6 |
| 5,426,284 | 6/1995 | Doyle | 705/28 |
| 5,448,110 * | 9/1995 | Tuttle et al. | 340/825.54 |
| 5,510,770 | 4/1996 | Rhoads | 340/572.3 |
| 5,521,815 | 5/1996 | Rose, Jr. | 705/28 |
| 5,528,222 | 6/1996 | Moskowitz et al. | 340/572.7 |
| 5,533,079 | 7/1996 | Colburn et al. | 377/6 |
| 5,574,470 * | 11/1996 | De Vall | 340/572.1 |
| 5,627,520 | 5/1997 | Grubbs et al. | 340/572.1 |
| 5,661,457 * | 8/1997 | Ghalfari et al. | 340/572.7 |
| 5,671,362 | 9/1997 | Cowe et al. | 340/568.1 |
| 5,689,238 | 11/1997 | Cannon, Jr. et al. | 340/572.1 |
| 5,708,419 * | 1/1998 | Isaacson et al. | 340/572.1 |
| 5,777,884 | 7/1998 | Belka et al. | 700/225 |
| 5,801,628 | 9/1998 | Maloney | 340/568.2 |
| 5,963,134 * | 10/1999 | Bowers et al. | 340/572.1 |
| 6,075,441 | 6/2000 | Maloney | 340/568.1 |

* cited by examiner

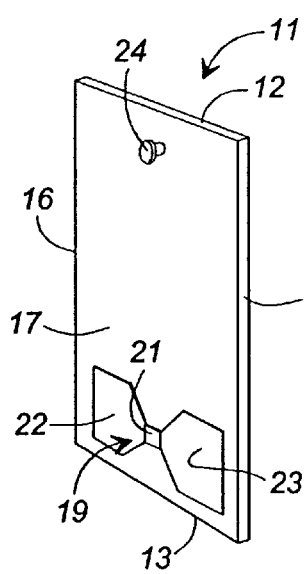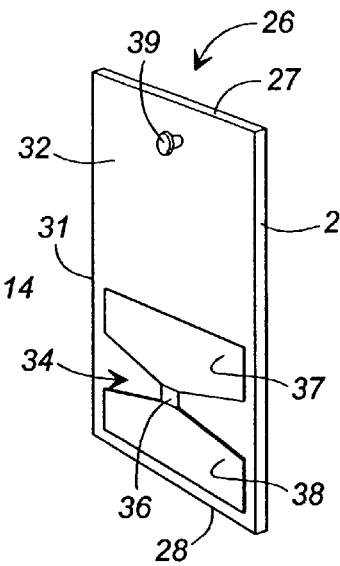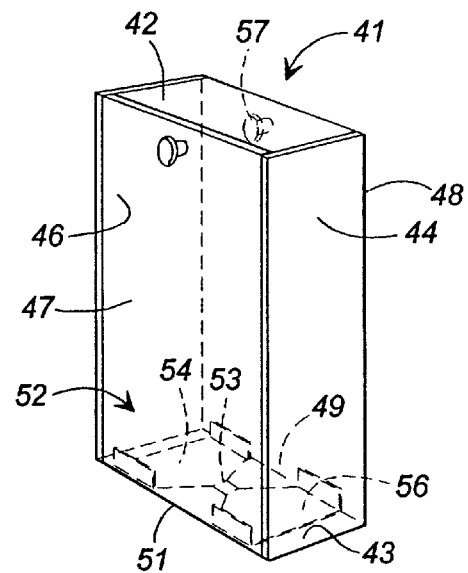
FIG. 1    FIG. 2    FIG. 3
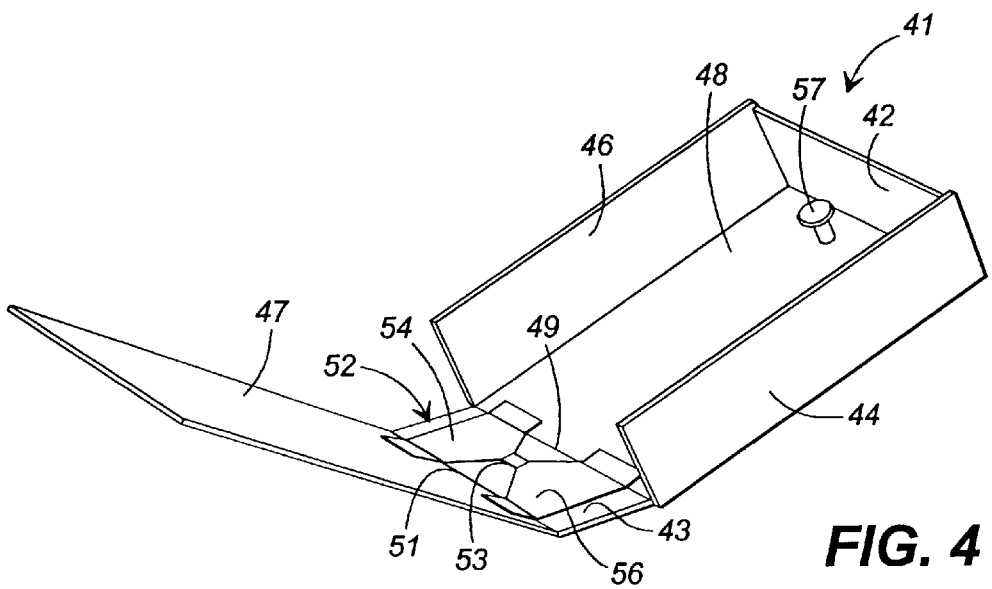
FIG. 4

OBJECT TRACKING SYSTEM WITH NON-CONTACT OBJECT DETECTION AND IDENTIFICATION

REFERENCE TO RELATED APPLICATIONS

This application claims the benefit of the filing date of prior filed U.S. Provisional Patent Application serial no. 60/099,954, filed Sep. 11, 1998.

TECHNICAL FIELD

This invention relates generally to object tracking and control systems and more particularly to systems for tracking and controlling access to and disposition of objects such as keys.

BACKGROUND

Many objects have intrinsic value or have value because they provide access to other valuable objects. For instance, jewelry and coins have inherent intrinsic value while keys, such as keys to vehicles, have value because they provide access to other valuable objects, namely automobiles and trucks. Further, access to and control of some items, such as narcotics for example, needs to be monitored, tracked, and controlled to assure against unauthorized access or assure that proper and appropriate accesses catalogued. There is a serious need to be able to track, catalogue access to, and control such objects in a way that is reliable, simple to implement, and virtually tamper proof.

In the past, a variety of systems have been implemented to track and control objects. In the case of keys in an automobile dealership, for example, pegboards have been used to keep track of the keys as sales persons, maintenance personnel, and others remove keys for access to vehicles. Generally, sign out sheets are used to log the check-in and checkout of such keys. Obviously, such a manual system of tracking has numerous shortcomings due in large part to the very real potential of human error and forgetfulness in carrying out the sign-in and sign-out procedures.

More recently, automated computer controlled key tracking systems have been implemented for tracking, for example, vehicle keys at car lots and keys to the apartments of apartment complexes. One such system particularly applicable to the present invention is the key tracking system disclosed and claimed in my U.S. Pat. No. 5,801,628 the disclosure of which is hereby incorporated fully by reference. In the disclosed system, referred to herein as the "Key Track" system, keys to a vehicle are attached with a rivet or the like to a thin plastic key tag or card having a depending tongue. The tongue carries a small button shaped electronic touch memory device, which electronically stores a unique code. The tongues of the key tags are configured to be insertable in an array of slots formed in a top panel within a storage drawer. A printed circuit backplane is disposed beneath the top panel and is provided with a plurality of pairs of metal contacts, each pair of contacts being aligned with a corresponding one of the slots in the top panel. When the tongue of a key card is inserted in a selected one of the slots, its touch memory device is engaged by the corresponding pair of contacts.

A computer or microprocessor or microcontroller based controller is electronically coupled through a communications matrix to the contacts on the backplane and periodically polls each pair of contacts, preferably several times per second, to determine the presence or absence of a touch memory device and thus which slots contain key cards and which do not. More specifically, if no information is received from a particular pair of contacts when polled, it is determined that the slot corresponding to the pair of contacts is empty. When a slot contains a key card, the touch memory device of the card responds to the poll by transmitting its unique code, from which the identity of the particular key attached to the card can be determined through a table lookup. In this way, the absence or presence and location in the storage drawer of key cards and their associated keys can be noted by the controller each time the array of contacts are polled. If a card present in a slot on a prior polling is absent on a subsequent polling, then the controller notes that the card and its key have been removed from the storage drawer. Conversely, if a key card is detected in a previously empty slot, the controller notes that the card and its key have been replaced in the storage drawer. The removal and replacement of keys is therefore continuously monitored.

An access feature requires an authorized user such as a sales person to enter an ID code to unlock and access the storage drawer. When the history of removal and replacement of key cards and their keys is combined with other information, such as the time at which cards are removed and replaced and the identities of the persons who accessed the drawer and times of access, access to the keys in the drawer can be controlled and a detailed tracking log can be created. This Key Track system greatly decreases instances of lost keys, reduces the time required to find checked-out keys, and generally provides automatic tracking and control of the keys, and thus, to a large extent, controls and tracks the vehicles to which the keys provide access.

While the Key Track system described above has proven extremely valuable in the tracking and control of keys, it nevertheless has certain problems and shortcomings inherent in its design. For example, the backplane of the system, which may contain dozens of upstanding metal contacts for engaging the electronic touch memory devices of key cards, can be relatively complex and labor intensive to fabricate and requires precision in the placement and orientation of contact pairs. In addition, foreign items such as loose keys or other small metal items that may inadvertently be dropped into or hang through one of the slots in the top panel can and sometimes do short the contacts on the backplane, resulting in the potential for false key tracking logs or, in extreme cases, error conditions that can result in degradation of the integrity of the entire system. Furthermore, because the reading of the codes stored in the touch memory devices relies upon physical contact between the touch memory devices and the electrical contacts on the backplane, resistances that can result from corroded contacts or dirty touch memory devices can also result in false and degrading readings. Additionally, the electrical contacts sometimes become bent or sprung so that they fail to make proper contact with the touch memory devices of key cards placed in their corresponding slots. These and other related problems all result from the requirement in the Key Track system that object detection and identification relies upon physical electrical contact between a set of electrical contacts and an electronic touch memory device.

Thus, even though the Key Track system has proven very useful and successful, there exists a continuing need to enhance the system in such a way that the problems mentioned above are addressed in an efficient, economic, and reliable way. It is to the provision of such enhancements and improvements that the present invention is primarily directed.

SUMMARY OF THE INVENTION

Briefly described, the present invention, in one preferred embodiment thereof, comprises enhancements and improvements to the Key Track system disclosed in my U.S. Pat. No. 5,801,628 to address the problems resulting from the requirement of physical electrical contact for detecting and identifying objects. More specifically, the invention comprises an object tracking system for tracking the removal of objects from a location and the replacement of the objects at the location. In the preferred embodiment, the objects to be tracked are thin plastic cards to which keys can be attached or small containers into which keys or other items can be placed. Keys may also be attached to the outside surfaces of the containers if desired. It should be understood, however, that the present invention is applicable to a wide variety of objects other than these. The key cards and containers that are the "objects" in the present disclosure are exemplary only and represent the best mode of practicing the invention, but are not intended to impose limitations on the invention. In this disclosure, the term "objects" is used in the context of the preferred embodiment to refer to the key cards and containers in combination with the keys attached thereto. It should be understood, however, that the "object" should be interpreted to any item that is desired to be tracked and monitored with the system of this invention and is not limited to key cards, containers, keys, or any other particular item.

An ID tag is attached to each of the objects to be tracked by the system and each ID tag includes electronic storage means carrying a stored code associated with the object to which the ID tag is attached. If another item, such as a key, is attached to the object, then the code also identifies the other item. Each ID tag is adapted to transmit its stored code by means of non-contact transmission such as, for example, radio frequency transmission, when the ID tag is appropriately activated.

A storage unit is provided at the location with the storage unit having a plurality of receptacles configured to receive objects when objects are replaced at the location and to allow the objects to be selectively removed from the storage unit when the objects are to be removed from the location. A sensor is associated with each of the receptacles in the storage unit for activating the ID tag of an object in the receptacle and, in turn, detecting the resulting transmission by the ID tag of the stored code associated with the object. Selection circuitry is coupled to the sensors for successively selecting the sensors. Each sensor, when selected, detects the stored code associated with an object if an object is present in the corresponding receptacle and detects no code if an object is not present in the corresponding receptacle.

A computer or microprocessor based or other appropriate controller is coupled to the sensors through a communications link for receiving stored codes detected by the sensors and determining, based on the received codes, the absence of objects removed from the storage unit and the presence and location within the storage unit of objects present in the storage unit.

In the preferred embodiment, the ID tags attached to the objects are radio frequency identification (RFID) tags, which are adapted to transmit their stored codes through radio frequency transmission when the tags are appropriately activated. Each of the ID tags includes an antenna for transmitting its stored code and, in one embodiment, for receiving data to be stored or acted on by the RFID tag. Each of the sensors includes an antenna for activating the RFID tags and receiving stored codes transmitted thereby and/or convey data to the RFID tags. In one preferred embodiment, the antenna of each RFID tag comprises a pair of capacitive plates located on the object and the antenna of each sensor comprises a pair of capacitive plates positioned to align with the capacitive plates of an RFID tag when an object bearing the RFID tag is placed in the corresponding receptacle of the storage unit. In another embodiment, the antenna of each RFID tag comprises an inductive loop antenna coupled to the RFID tag and the antenna of each sensor includes a corresponding inductive loop positioned to align with the loop of an RFID tag when an object bearing the RFID tag is inserted in a corresponding receptacle of the storage unit. In either case, the RFID tag of an object in a receptacle of the storage unit is activated when radio frequency power is supplied to the antenna of the sensor corresponding to the receptacle and the code of the RFID tag is detected by the sensor and conveyed through the communications link to the controller. Thus, detection and identification of objects within the storage unit is accomplished through non-contact radio frequency transmissions.

The object tracking system of the present invention provides a number of advantages over systems requiring physical electrical contact for detection and identification of objects in a storage unit. For example, since codes are conveyed not through physical contact but rather through radio frequency transmission or through modulation of a radio frequency signal, foreign objects that may fall into the storage unit do not result in shorted contacts and have little effect on the integrity and reliability of the system. Further, when this invention is applied to an object tracking system including a panel with receptacles and a backplane, the antenna of the sensors can be formed on the backplane in inexpensive and reliable ways such as, for example, through common printed circuit board etching techniques. The sensors can be formed on the back side of the backplane if desired to protect the sensors further. Thus, not only is the system more reliable than prior art systems, it is also more economical to produce. Finally, because the detection of codes is accomplished through radio frequency transmissions, problems associated with interference or cross-talk in the data matrix that must be addressed with systems employing physical contacts are much less prevalent and, even where present, are simpler to address. Also, since no physical electrical contact is required for detecting codes, problems associated with corroded or bent contacts or dirty touch memory devices are eliminated altogether. As a matter of fact, the present object tracking system functions as well in commonly encountered dirty or corrosive conditions as in clean conditions. Finally, since the RFID tags have no polarity requirements as do physical contacts, the objects can be placed in the slots in any orientation.

Thus it is seen that an improved object tracking system is now provided that successfully addresses the shortcomings of prior systems wherein physical electrical contact has been required for object detection and identification. The system lends itself to a wide variety of applications where it would otherwise be difficult to employ systems requiring physical electrical contacts and is economical, robust, and reliable. These and other features, objects, and advantages will become more apparent upon review of the detailed description set forth below when taken in conjunction with the accompanying drawings, which are briefly described as follows.

BRIEF DESCRIPTION OF THE DRAWINGS

FIG. 1 is a perspective view of an object in the form of a key card for use with an object tracking system of this invention illustrating one preferred placement and configuration of a capacitive plate antenna and RFID tag.

FIG. 2 is a perspective view of an object in the form of a key card illustrating an alternate configuration of the capacitive plate antenna.

FIG. 3 is a perspective view of an object in the form of a box or container bearing an RFID tag with a capacitive plate antenna having a preferred configuration.

FIG. 4 is a perspective view of the container of FIG. 3 opened to reveal its interior and placement of the RFID tag and its capacitive plate antenna.

DETAILED DESCRIPTION OF THE PREFERRED EMBODIMENTS

Figure 5:
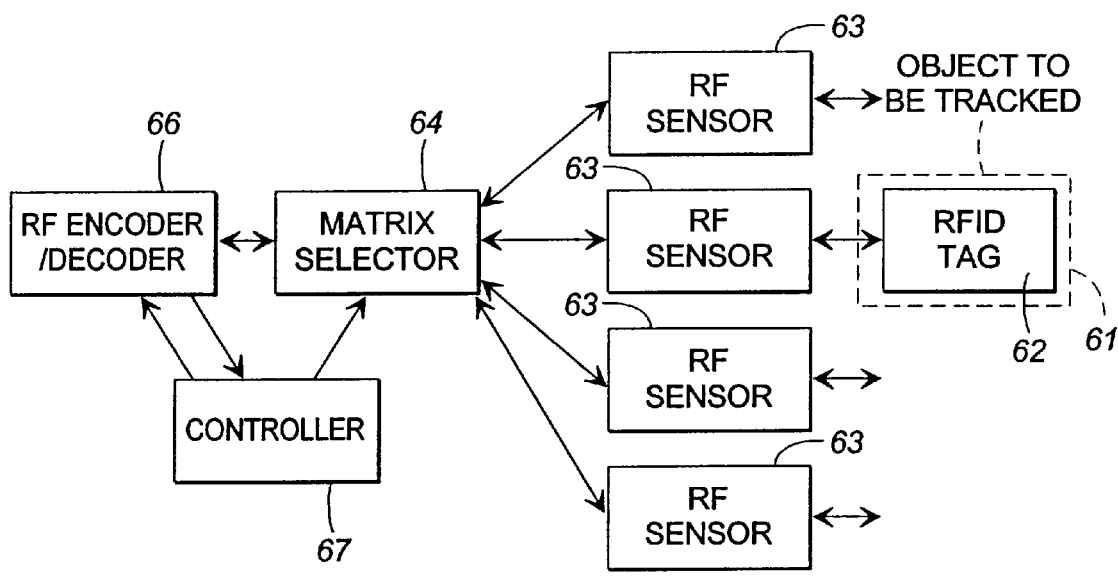
FIG. 5 is a functional block diagram of an object tracking system that embodies principles of the present invention in a preferred form.

The present invention will be described in detail within the general context of a key or small item tracking system. In such a system, keys to vehicles are attached to key cards (or placed in or on the outside surface of small containers), which are checked out from and replaced in a centrally located storage unit. Each key card is provided with an RFID tag. The storage unit preferably has a top panel formed with an array of receptacles for receiving the key cards. A backplane is disposed beneath the panel and has an array of sensors for detecting and identifying key cards located in the receptacles of the storage unit. This configuration is discussed in detail in my issued patent, which provides background for the discussions that follow.

Even though a preferred embodiment of the invention is as a key or small item tracking system, it should be kept in mind during review of the detailed description that follows that the invention has a wide variety of uses wherever there is a need to track access to and location of objects. In many such configurations, the RFID tags may be attached directly to the objects that ultimately are to be tracked, although in the preferred embodiments, the "objects" to which the RFID tags are attached are key cards or containers and the keys attached thereto are the items ultimately to be tracked. The particular context within which the invention is described should therefore not be considered to be a limitation of the invention.

Referring now in more detail to the drawings, in which like numerals refer to like parts throughout the several views, FIG. 1 illustrates a key card for use with a Key Track system embodying principles of the present invention. The key card 11 is generally rectangular in shape and has a top edge 12, a bottom edge 13, a right side edge 14, and a left side edge 16. The card 11 defines a front face 17 and a rear face 18 (not shown in FIG. 1) and is sized to be inserted in and removed from any of a number of slots or receptacles in a storage unit. An attachment lug 24, which may be a rivet or some other attachment mechanism, is mounted adjacent top edge 12 of the card for attaching a key or a set of keys to the card. A radio frequency identification (RFID) tag 19 is attached to the card 11 adjacent its bottom edge 13. The RFID tag 19 includes an integrated circuit chip 21 coupled to an antenna, which, in this embodiment, comprises a capacitive plate antenna defined by first capacitive plate 22 and a second capacitive plate 23. The capacitive plates 22 and 23 can be fabricated of any suitable conductive or semiconductive material such as, for example, conductive foil or, more preferably, resistive ink.

RFID tags such as those illustrated in FIG. 1 and throughout the figures of this disclosure are commercially available devices and can be obtained from a number of suppliers including Microchip Corporation, Motorola, and Texas Instruments. At this writing, only Motorola is known to supply capacitive RFID tags while all of these companies supply inductive loop RFID tags. Also available from these suppliers are the "chip sets" that accompany the RFID tags. These chip sets include related electronic components such as encoder/decoder chips for detecting and decoding information conveyed by the RFID tags. In general, two types of RFID tags are available; inductive tags and capacitive tags. Application of inductive RFID tags in the present invention is described below. Capacitive RFID tags, one of which is available from Motorola under the trade name Bistatix, are suitable for use in the present invention. In general, the distinction between inductive and capacitive RFID tags is that in inductive tags, radio frequency information is conveyed through inductively coupled loop antennas and in capacitive tags, radio frequency information is conveyed through capacitively coupled plate antennas. The detailed operation of RFID tags is beyond the scope of the present disclosure. Such detail information is published by the manufacturers of these devices and is generally available.

FIG. 2 depicts an embodiment of a key card that embodies principals of the invention in an alternate form. The key card 26 is similar to the key card 11 of FIG. 1 and has a top edge 27, a bottom edge 28, a right side edge 29, and a left side edge 31. The card defines a front face 32 and a back face 33 (not visible in FIG. 2). An RFID tag 34 is attached to the card 26 adjacent its bottom edge. The RFID tag 34 comprises an integrated circuit chip 36 and an associated antenna formed by a first capacitive plate 37 and a second capacitive plate 38. The alternate embodiment of FIG. 2 is similar in all respects to the embodiment of FIG. 1 except that, in FIG. 1, the capacitive plate antenna is arrayed horizontally adjacent the bottom edge 13 of the card while in FIG. 2 the capacitive plate antenna is arrayed vertically. The implications and applications of these alternate configurations are discussed in more detail below.

In FIGS. 1 and 2, the RFID tags, including their antennae, are illustrated as being attached to the front faces of their respective key cards. It will be understood, however, that the tags and their antennae can just as well be attached to the back faces of the cards, covered by a protective coating, or, even more preferably, embedded within the material of the cards themselves. Embedding the RFID tags and their antennae is advantageous since they are then protected from the elements and from being scratched or scraped off of the card as a result of rough handling.

FIG. 3 illustrates yet another alternate and preferred embodiment comprising an openable container 41 for use with an object tracking system of this invention. The container 41, which may be molded of plastic, comprises a top side 42, a bottom side 43, a right side 44, and a left side 46. A back panel 47 closes the back of the container and a hingeable cover 47, when shut, closes the front of the container to define an interior compartment within the container. An attachment lug 57 can be provided within the compartment or, alternatively, on the outside of the container if preferred for attaching keys or other objects to the container. A capacitive RFID tag is attached to the bottom side 43 of the container 41, preferably on the inside of the container. As with the embodiments of FIGS. 1 and 2, the RFID tag 52 comprises an integrated circuit chip 53 and an associated antenna formed of a first capacitive plate 54 and a second capacitive plate 56.

FIG. 4 illustrates the container 41 of FIG. 3 in its open configuration. The attachment of the RFID tag 52 to the inside surface of the bottom side 43 of the container is illustrated more clearly. Attaching the RFID tag in this manner provides for ease of fabrication techniques. In fact, one configuration in which capacitive RFID tags may be available is in the form of adhesive stamps or stickers, which can simply be adhered to the interior surface of the bottom side 43 of the container during the fabrication process. Alternatively the RFID tag can be attached to the outside surface of the bottom side or embedded within the plastic material of the container to protect it from contamination and abuse.

While the embodiment of FIGS. 3 and 4 is illustrated as a container with an interior compartment for containing keys or other objects, it may judiciously be fabricated as a permanently or semi-permanently closed structure with an attachment lug on the outside. In such a configuration, the embodiment of FIG. 3 would function similar to a key card such as those shown in FIGS. 1 and 2 but the RFID tag would be located on the bottom of the closed container and would be enclosed to protect it from the elements and to provide more efficient implementation in a system having a storage unit with a top panel defining compartments and a backplane, as described in more detail below.

FIG. 5 illustrates, in the form of a functional block diagram the primary elements of an object tracking system making use of RFID tags such as those illustrated in FIGS. 1–3. In many respects, this system is similar to that disclosed in U.S. Pat. No. 5,801,628. In general, the system comprises a number of objects to be tracked, one such object 61 being illustrated in FIG. 5. These objects can be key cards or containers as shown in FIGS. 1–3 or virtually any other type of object whose removal and replacement at a central or storage location needs to be tracked. An RFID tag 62 is attached to each object 61. As with prior Key Track systems, the goal of the object tracking system of this invention is to determine the absence or presence and location of objects at a central location wherein a storage unit having a number of RF sensors 63 may be present. As described in more detail below, each of the RF sensors at the location is associated with an object receptacle and is electronically coupled to a matrix selector, which has the ability to activate or, in other words, to apply an RF carrier signal to the RF sensors sequentially or otherwise. Activation of an RF sensor 63 associated with a receptacle where an object 61 is present causes the RFID tag 62 of the object 61 to activate and convey its stored identification code to the RF sensor 63. The codes conveyed by the RFID tags to the RF sensors are received and decoded by a radio frequency encoder/decoder 66. The matrix selector and RF encode/decoder are connected to a computer or microprocessor based controller 67, which directs the activities of these devices to track and log the removal and replacement of objects 61 at the location.

Figure 6:
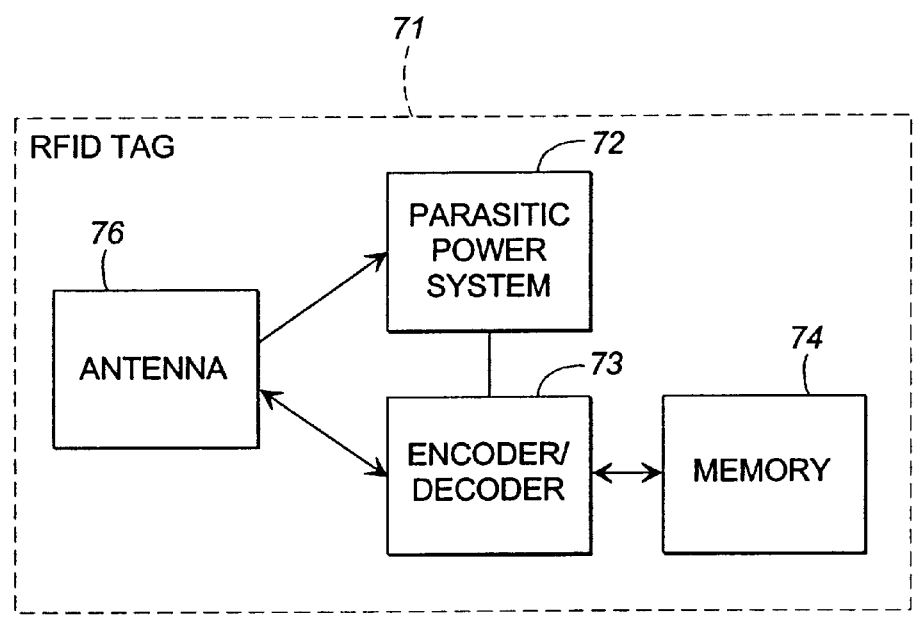
FIG. 6 is a functional block diagram showing the components of an RFID tag attached to an object to be tracked.

FIG. 6 illustrates, in the form of a functional block diagram, the major components of a typical RFID tag. As mentioned above, such tags are commercially available and their detailed operation is beyond the scope of this disclosure. However, a general understanding of their operation is helpful. Further, while FIG. 6 illustrates a passive RFID tag, it will be understood by those of skill in the art that active RFID tags are also available and can be used. Active tags generally include their own power source and some are capable of receiving and storing information as well as conveying information as do passive RFID tags. In the passive RFID tag 71 illustrated in FIG. 6, a parasitic power system 72 is provided on the chip for drawing electrical power from the radio frequency signal produced by the antenna of an adjacent RF sensor. An electronic memory 74 is provided for storing the unique code of the RFID tag and an encoder/decoder 73 is coupled to the memory for producing radio frequency modulations that carry the unique code stored in memory. The encoder/decoder and power system are coupled to an antenna 76, which can be a capacitive plate antenna such as that illustrated in FIGS. 1–4, an inductive loop antenna, or another appropriate type of antenna. The antenna of the tag is adapted for radio frequency coupling to the antenna of an RF sensor to convey the code of the RFID tag to the sensor and on to the controller of an object tracking system for processing.

Figure 7:
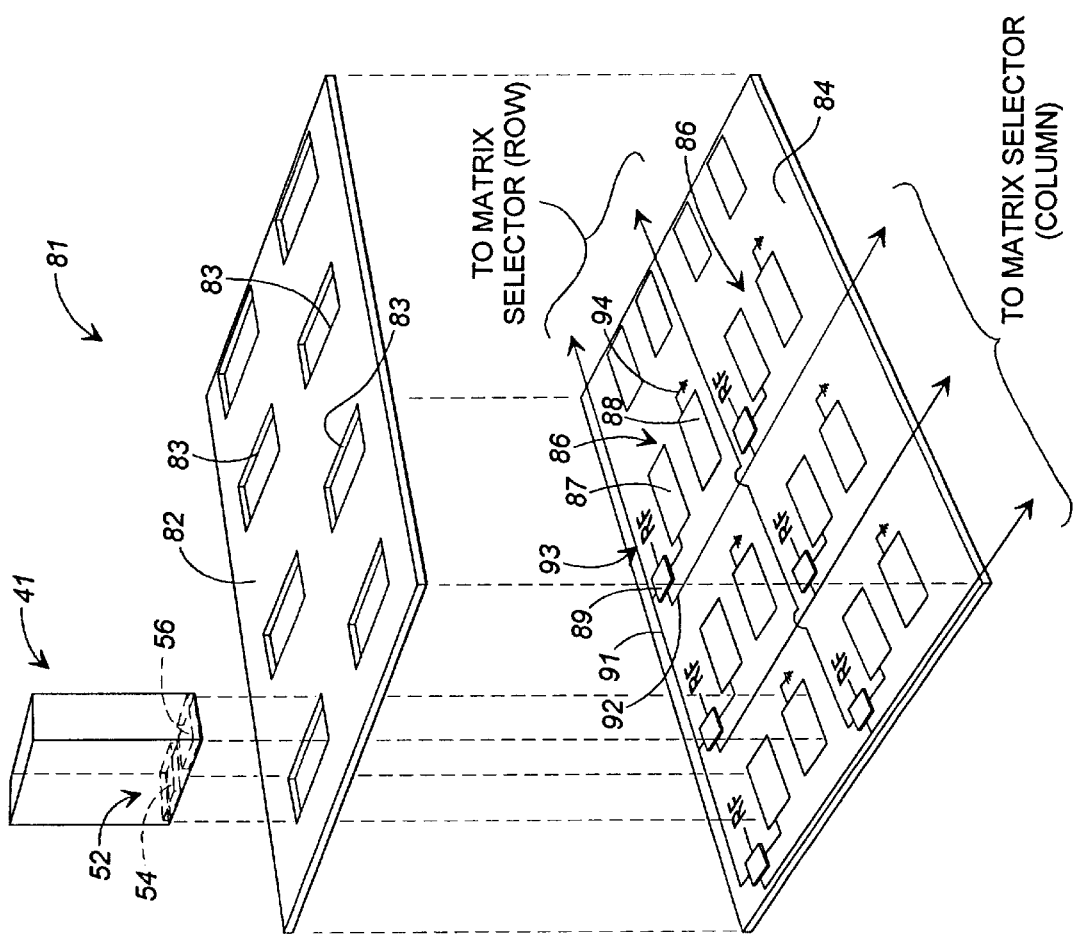
FIG. 7 is an exploded perspective view illustrating a preferred implementation of the object tracking system of this invention wherein the sensors of the system are formed on a backplane positioned beneath a receptacle panel of a storage unit.

FIG. 7 depicts one preferred embodiment of an object tracking system that embodies principles of the invention in a preferred form. In this system the objects to be tracked comprise the containers 41 (and their attached keys) illustrated in FIG. 3 with the containers having RFID tags 52 with an antenna formed by capacitive plates 54 and 56. It should be understood that principles illustrated in FIG. 7 are equally applicable to other objects to be tracked and to other configurations of RFID tags.

The system of FIG. 7 comprises a storage unit such as, for example, a drawer, generally indicated at 81, at a location where the objects 41 are to be checked out and checked back in by personnel. The storage unit 81 includes a top panel 82 formed with an array of openings 83, each of which define a receptacle sized and configured to receive an object 41. Since the RFID tags are polarity insensitive, the slots need not be keyed to ensure a particular orientation of the object 41 when inserted in a receptacle. The storage unit 81 also includes a backplane 84, which is disposed beneath and spaced from the top panel 82. The backplane 84, which preferably takes the form of a printed circuit board, carries the radio frequency sensors and related electronics for receiving the codes of RFID tags attached to objects inserted in the receptacles 83. More specifically, an RF sensor corresponding to and aligned with each of the receptacles 83 is formed on the backplane and comprises a capacitive plate antenna formed by a first capacitive plate 87 and a second capacitive plate 88.

The capacitive plates 87 and 88 are positioned on the backplane 84 such that they align with the capacitive plates 54 and 56 attached to an object inserted in the corresponding receptacle 83. That is, when the object is inserted in the receptacle such that its bottom side rests on the backplane, the capacitive plates 54 and 56 attached to the object align with and are disposed adjacent to the capacitive plates 87 and 88 of the respective sensor. While the capacitive plates 87 and 88 are shown on the top surface of the backplane in FIG. 7, they can also be formed on the bottom surface if desired to provide better protection.

One of the capacitive plates 88 of each RF sensor is connected to radio frequency ground 94 while the other is coupled, through a radio frequency switch 89, to a radio frequency source 93. Each radio frequency switch 89, in turn, is connected to a row and column selection buss and all the row and column selection busses are electronically coupled to the matrix selector. The matrix selector is configured to address the row and column of an RF sensor in the array of sensors to activate that sensor for receiving codes of an object, if any, in the receptacle corresponding to the sensor. By "selection" it is meant that a radio frequency carrier signal is applied to the plates of the sensor through the switch 89. One implementation of this selection or switching or polling process is described in more detail below.

The storage unit 81 is indicated generically in FIG. 7. It should be understood that this unit can take on a number of different variations and configurations. For example, the panel 82 and backplane 84 can be disposed in a lockable drawer such as that illustrated in U.S. Pat. No. 5,801,628. Alternatively, the system could be configured as a vertically oriented wall panel or in any other form convenient for storing the particular objects desired to be tracked. Accordingly, the particular configuration of the storage unit in the context of which this application is described should not be considered to be a limitation of the invention, even though it is considered by the inventor to be a best mode of practicing the invention.

The object tracking system shown in FIG. 7 is similar in some functional respects to that of prior Key Track systems. Specifically, the matrix selector, controlled by the controller, sequentially activates or polls the RF sensors on the backplane. If an object 41 bearing an RFID tag 52 is present in a receptacle corresponding to a particular RF sensor, the RFID tag of the object is activated upon selection of the sensor to convey its code to the RF sensor. The code is then transmitted or conveyed to the controller, which notes that the object corresponding to the received code is present in the storage unit and is located in the receptacle corresponding to the RF sensor that received the code. Alternatively, if no code is received when a sensor is polled, the controller notes that there is no object present in the receptacle corresponding to that sensor.

By sequentially polling the sensors in relatively rapid order (preferably several times per second) the controller is able to log when objects are removed from the storage unit, when they are replaced, and also the location or receptacle within the storage unit where an object is located. More specifically, if an object is detected in a receptacle during one polling cycle and is not detected in a subsequent cycle, then the controller notes that the object has been removed from the storage unit. Alternatively, if no object is noted on a polling cycle and an object is detected on a subsequent polling cycle, then the controller notes that the object has been replaced in the storage unit and that it is located at the receptacle corresponding to the sensor that detected the object. As with prior Key Track systems, this information can be compiled to create logs, reports, control commands, alarm generating signals, and otherwise for tracking and controlling access to the objects.

Figure 8:
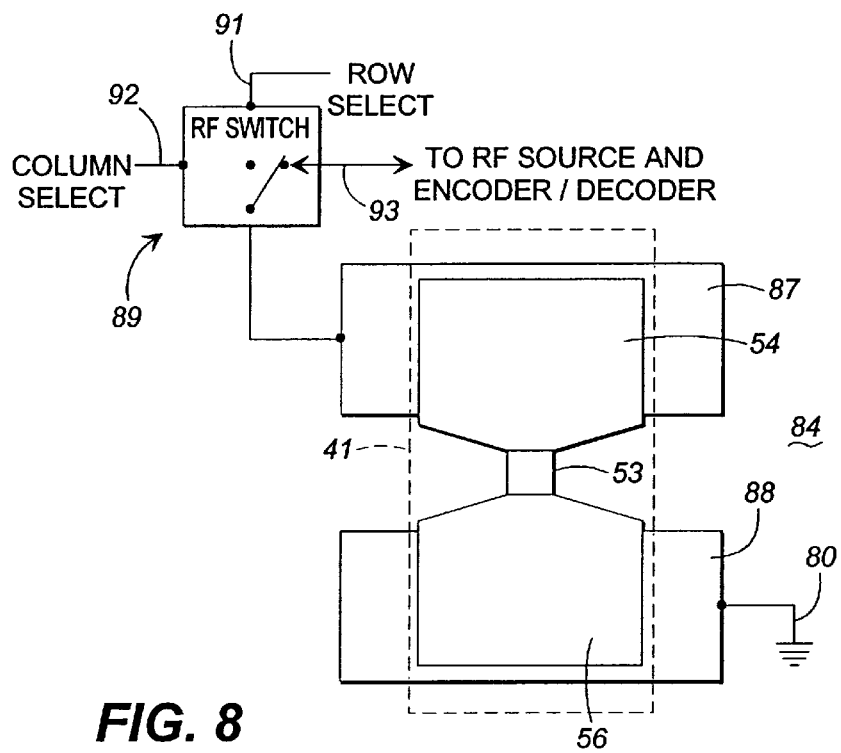
FIG. 8 is a top plan view illustrating alignment of the capacitive plate antenna of an RFID tag on an object with the capacitive plate antenna of a sensor on the backplane of FIG. 7.

FIG. 8 illustrates the alignment of the capacitive plate antenna attached to an object with the capacitive plates of an RF sensor on the backplane of the system of FIG. 7 when the object is placed in a receptacle corresponding to the RF sensor. Specifically, the capacitive plates 54 and 56 of the RFID tag attached to the object 41 each align with a respective one of the capacitive plates 87 and 88 and are disposed closely adjacent to but generally not contacting the sensor plates (although the system will operate with the plates in contact. In this way, a parallel plate capacitor is formed by each capacitive plate of the RFID tag and the corresponding capacitive plate of the RF sensor on the backplane. As mentioned above, one of the capacitive plates of the RF sensor is coupled to radio frequency ground at 80 while the other is coupled to a radio frequency source 93 through a radio frequency switch 89. The switch can be activated when the row and column of the switch is selected by the matrix selector through a row select line 91 and a column select line 92. When the row and column of the sensor is not selected, the radio frequency switch is off, the RF carrier signal is not applied to plate 87, and the RF sensor at that location is not activated.

Figure 9:
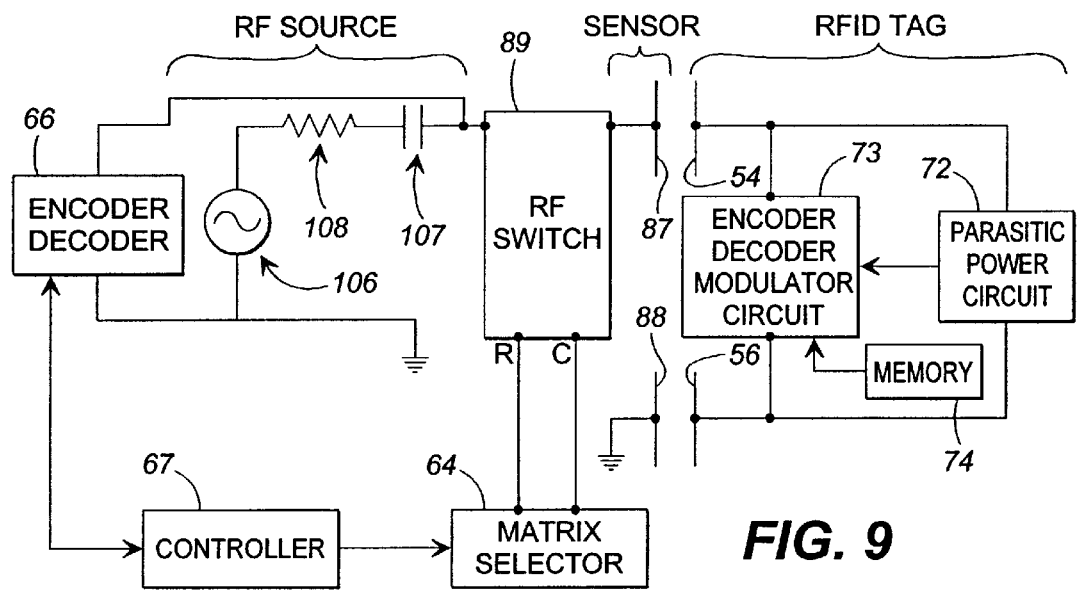
FIG. 9 is a simple functional schematic illustrating interrelations of the components of the present invention.

FIG. 9 is a functional electronic schematic diagram illustrating the interactions of the various components of the system. On the right, the RFID tag, which in reality is all incorporated on the integrated circuit chip 53 (FIG. 8), includes its parasitic power circuit, encoder/decoder and modulator circuit, and memory. The antenna comprising, in this embodiment, capacitive plates 54 and 56, is coupled to the RFID tag and shown adjacent to the RF sensor's antenna comprising capacitive plates 87 and 88. Capacitive plates 54 and 87 form a parallel plate capacitor and plates 56 and 88 also form a parallel plate capacitor. Capacitive plate 87 of the sensor is selectively couplable through radio frequency switch 89 to the radio frequency source 106 and encoder/decoder 66. A practical RF source 106 has series source resistance 108 and a source reactance 107. The encoder/decoder 66 is connected across the combined source module 106, 107, and 108. The encoder/decoder 66 and the matrix selector 64 are controlled by the controller 67.

In general, the circuit of FIG. 9 operates as follows. When it is desired to poll the RF sensor to determine if an object is present in its associated receptacle, the controller triggers the matrix selector 64 to close the radio frequency switch 89 corresponding to the sensor. This couples capacitive plate 87 of the sensor's antenna to the radio frequency source 106. The radio frequency signal produced by the radio frequency source 106, in turn, is coupled by means of capacitive coupling to the capacitive plate 54 of the RFID tag. In this configuration, the capacitors essentially function or appear as short or very low impedance circuits to the RF signal, thus essentially connecting the RF signal directly to the RFID tag. The parasitic power circuit 72 within the RFID tag draws power from the radio frequency signal and, when sufficient power has been stored, the encoder/decoder-modulator circuit 73 is activated. The encoder/decoder modulator 73 then accesses the memory 74 and generates a modulating load across the capacitive plates 54 and 56 with the modulations corresponding to the unique code retrieved from memory. This process generally is known as "keying" and information can be modulated onto an RF carrier wave through various types of keying such as, for example, frequency shift keying (FSK), phase shift keying (PSK), or amplitude shift keying (ASK), and/or amplitude modulation. A discussion of such keying techniques is beyond the scope of the present disclosure, but all are known and understood by those skill in the art. The modulating load created by the encoder/decoder-modulator, in turn, causes the characteristics of the radio signal measured across the source 106, 107, and 108 to modulate in proportion to the modulations generated by the RFID tag. The encoder/decoder 66 is adapted to monitor these modulations and decode them into the original code stored in the memory 74 of the RFID tag. In this way, the RFID tag conveys its unique code to the encoder/decoder, which transmits it onto the controller for analysis. The controller can then determine the identity of the object bearing the RFID tag and process the information in an appropriate way.

While not illustrated in FIG. 9, an active RFID tag could also be used. As mentioned above, such active tags are able to receive and store information as well as transmit information. In such a system, the encoder/decoder 66 would also modulate the radio frequency signal supplied to the sensor. The encoder/decoder 73 of the RFID tag would then decode these modulations, extract the information contained therein, and store the information in a storage memory. Such a system could have a wide variety of uses. For example, the identity of the person checking out the object or other useful information might be stored in the RFID tag for access and processing at a later time. Both passive and active RFID tags are considered to be within the scope of the present invention.

Figure 10:
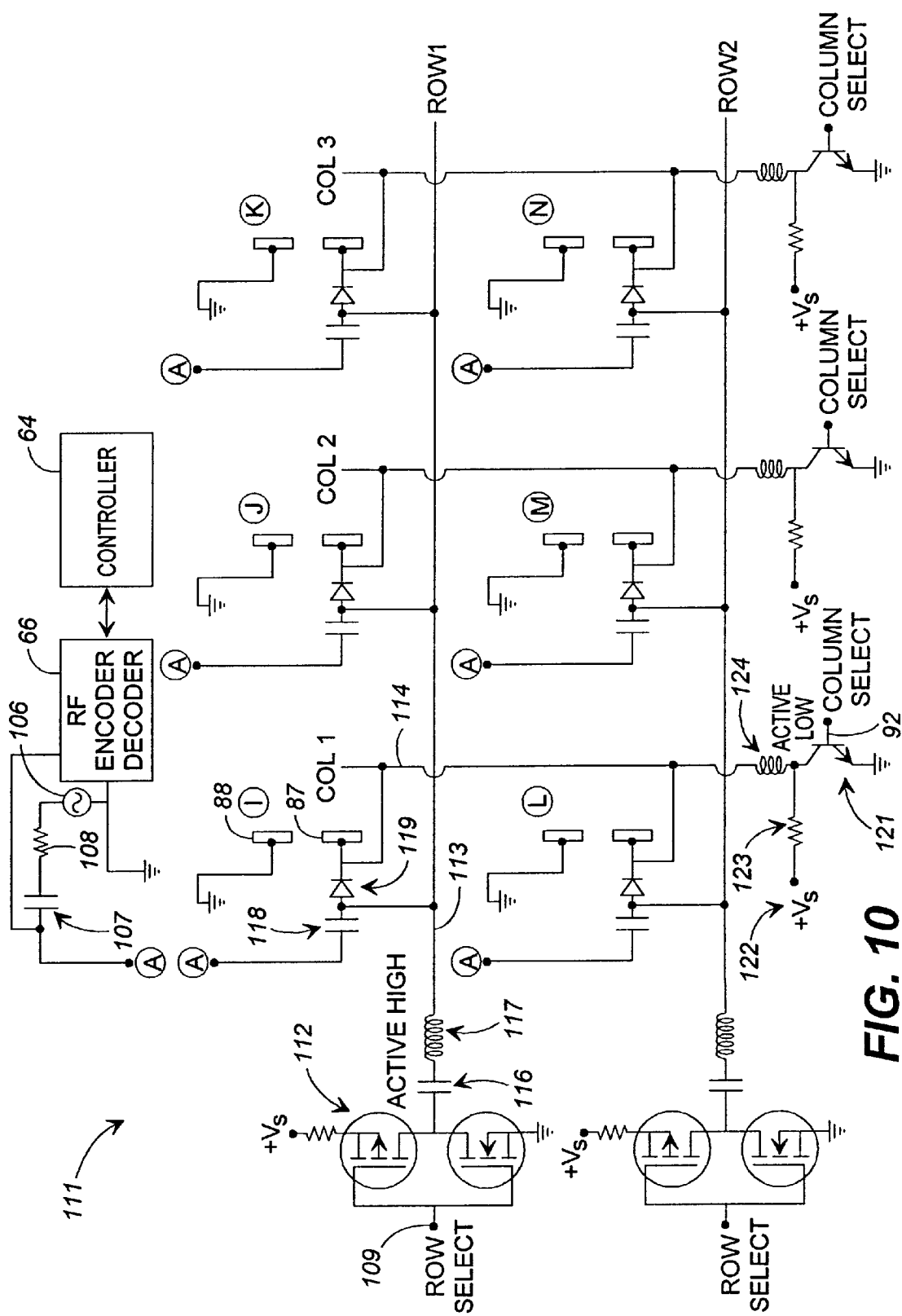
FIG. 10 is an electronic schematic illustrating one preferred mode of implementing principles of the present invention.

FIG. 10 is a detailed electronic schematic diagram illustrating one possible circuit implementation of the present invention. It will be understood by those of skill in the art that various other electronic circuits might also be applied to accomplish the same result; however, the circuit of FIG. 10 is preferred because of its simplicity and reliability.

In FIG. 10, the radio frequency source comprising elements 106, 107, and 108 is selectively couplable to the active plate 87 of each sensor at each location in the storage unit. While six such sensors are illustrated in FIG. 10 for clarity, it will be understood that an actual implementation might include dozens or more sensors. Selection and activation of a sensor will be described herein with reference to the sensor at location I on FIG. 10; however, the same discussion applies to the other sensor locations J, K, L, M, and N. When it desired to activate or select the sensor at location I, the controller, through the matrix selector, sets the row select 109 for row 1 to a low state and the column select 92 for column 1 to a high state. The low state of the row select 109 causes the N-channel MOSFET inverting switch 112 to set the row trace 113 to a high state. Similarly, the high state of column select 92 turns on transistor 121, pulling the column trace 114 to a low state. This causes diode 119 to be forward biased, which turns the diode on and connects capacitive plate 87 of the sensor at location I to the radio frequency source 106. Thus, the sensor at location I is activated, i.e. is connected to the RF carrier signal. However, the sensors at the other locations are not activated because their diodes are maintained in a reverse biased condition since only transistor 121 at column 1 is turned on.

Capacitor 118 forms a high pass filter that blocks DC voltages of the selection matrix from being transferred back to the RF source while allowing radio frequency modulations from an RFID tag to be transferred back for interpretation by the RF encoder/decoder 66. Inductances 117 and 124 form RF chokes that isolate row and column selector circuitry from the RF signals. If an object bearing an RFID tag is present at location I, its code will be conveyed to the RF encoder/decoder and then transmitted to the controller 64 in the manner previously described. If no object is present at location I, no code will be received. The controller can thus determine the absence of an object at location I or the presence of an object at location I.

The process is repeated sequentially for sensors at locations J, K, etc. by activating the appropriate row and column trace to forward bias their diode switches and connect them to the radio frequency source 106 and the encoder/decoder 66. Preferably, as mentioned above, the sensors at the various locations are polled continuously at a relatively high rate of several times per second. In this way, the controller can easily determine the time at which objects bearing RFID tags are removed and replaced at the storage location.

Figure 11:
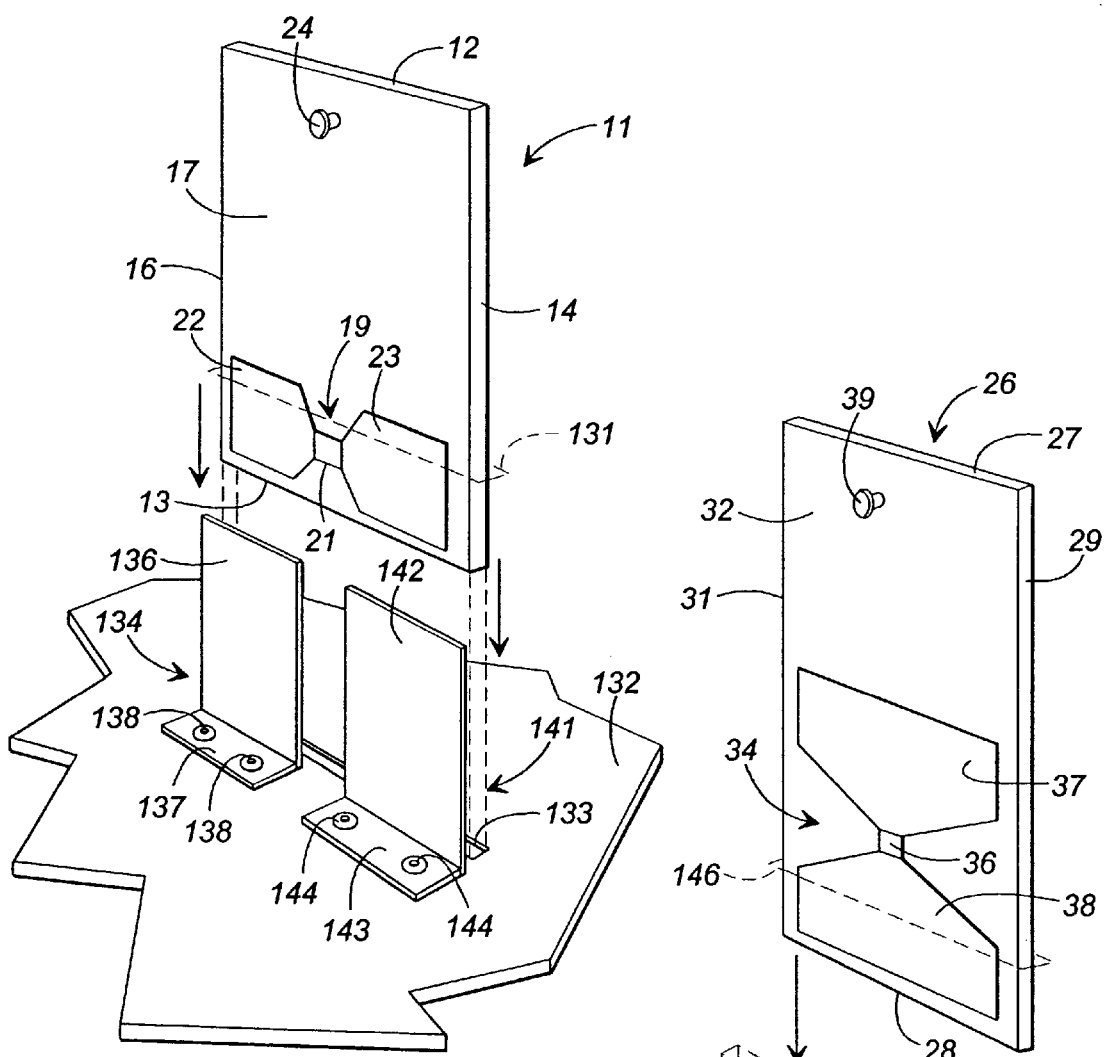
FIG. 11 illustrates one configuration of the capacitive plate sensors on the backplane of the system.

FIG. 11 illustrates an embodiment of the backplane of the present invention wherein the key card 11 of FIG. 1 is used. A receptacle 131 in the top panel of a storage unit (shown in phantom line in FIG. 11 for clarity) is sized to receive a key card 11. A backplane 132 is disposed beneath the top panel and spaced therefrom. Preferably, the backplane 132 also has a slot 133, which receives the bottom edge 13 of the key card 11 for aligning the key card within the storage unit. Capacitive plates 134 and 141 form the sensor in this embodiment. Capacitive plate 134 is configured with an upstanding leg 136 and an attachment tab 137. The attachment tab 137 is attached to the backplane 132 by means of rivets 138, or other appropriate fasteners. Similarly, capacitive plate 141 has an upstanding leg 142 and an attachment tab 143 attached to the backplane 132 by means of rivets 144. Capacitive plates 134 and 141 are attraxched to the selector circuitry and RF source as previously described.

With this configuration, it will be seen that when the key card 111 is inserted into the receptacle 131, the capacitive plates 22 and 23 of its RFID tag 19 align with capacitive plates 134 and 141 of the sensor. Activation of the RFID tag and conveyance of its code can thus be accomplished as described above.

Figure 12:
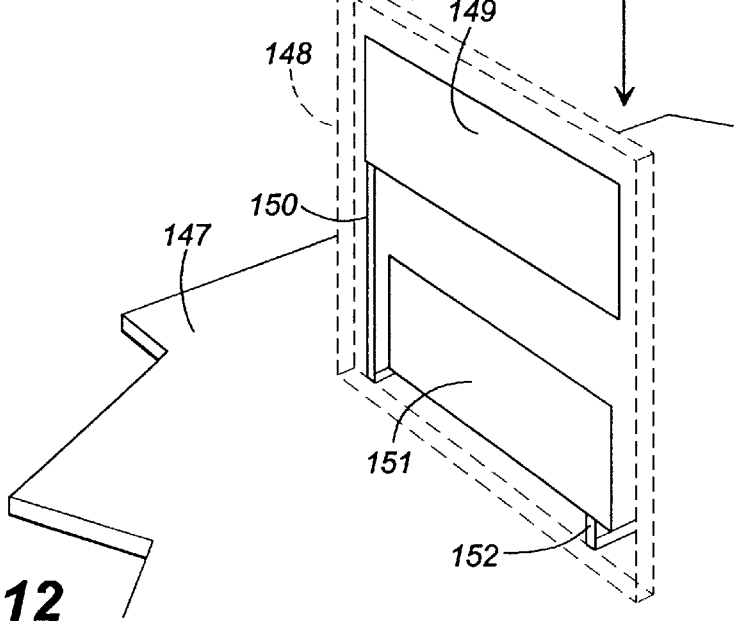
FIG. 12 illustrates an alternate configuration of the capacitive plate sensors on the backplane.

FIG. 12 illustrates an embodiment of the object tracking system for use with the key card 26 illustrated in FIG. 2. Here, the capacitive plates 37 and 38 of the RFID tag's antenna are oriented vertically on the key card 26. A receptacle 146 in a top panel is sized to receive the card and an alignment slot may also be provided in the backplane 147 if desired. A daughter board 148 is attached to and projects upwardly from the backplane 147. The daughter board 148 carries the sensor's antenna, which can be formed through PC board etching techniques and which comprises capacitive plates 149 and 151. Capacitive plate 149 is electrically connected to other components of the system such as the selector circuitry and RF source through a trace 150 and capacitive plate 151 is similarly connected through a trace 152. Preferably, the daughter board 148 is a small printed circuit board and the capacitive plates 149 and 151 are formed through standard printed circuit etching techniques, although other techniques can be used. When the key card 26 is inserted in the receptacle 146, its capacitive plates 37 and 38 aligned with capacitive plates 149 and 151 respectfully for activation of the RFID tag and transfer of its code to the controller.

Figure 13:
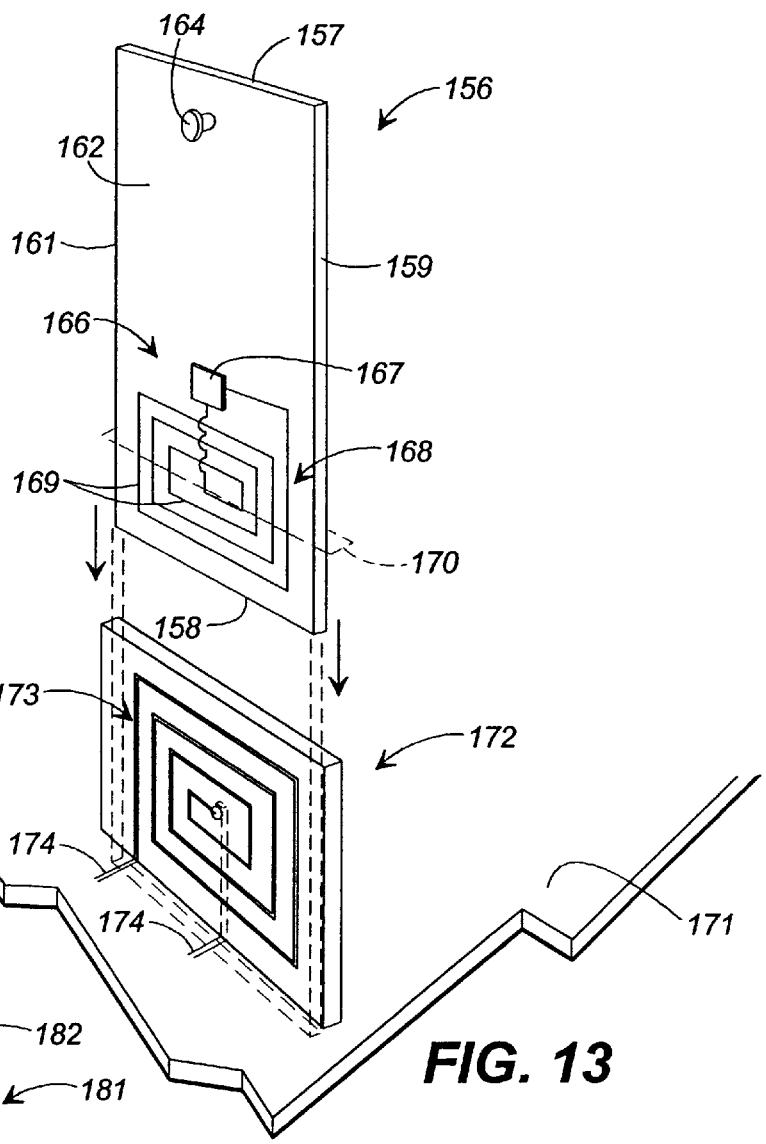
FIG. 13 illustrates an alternate embodiment of the present invention wherein the antennae of the ID tags and the antennae of the sensors are inductive loops.

FIG. 13 illustrates an alternate embodiment of the object tracking system of this invention, which makes use of inductive RFID tags rather than capacitive tags. Here, key card 156 has a top edge 157, a bottom edge 158, a right side edge 159, and a left side edge 161. The card defines a front face 162 and a back face 163 (not shown). An attachment lug 164 is provided for attaching a key or other item to a card. An RFID tag 166 is attached or embedded within to the key card and comprises a integrated circuit chip 167 and an antenna 168, which, in this embodiment, takes the form of a loop antenna 169.

The card 156 bearing RFID tag 166 is inserted in a receptacle 170 formed in the top panel of a storage unit. The unit's backplane 171 is provided with an upstanding daughter board 172 corresponding to the receptacle 170. The daughter board 172 carries the antenna of the RF sensor in the form of a looped antenna 173 that is connected to other components of the system through traces 174. When the key card 156 is inserted in the receptacle 170, its inductive loop antenna 168 aligns with the loop antenna 173 on the daughter board 172. Radio frequency energy can then be transferred to and from the RFID tag in the same way as with the capacitive RFID tag described above. However, in this embodiment, the radio frequency energy and information carried by modulations thereof is conveyed through inductive coupling between the two loop antennas 168 and 173. Otherwise, the system functions in the same way as the previous capacitively coupled embodiment.

Figures 14, 15:
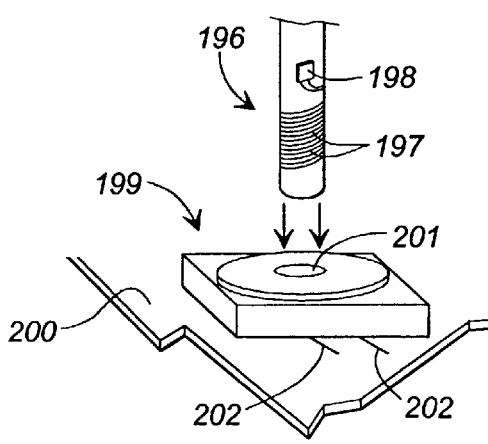
FIG. 14 is a perspective view illustrating an alternate configuration of the inductive loop antenna embodiment of this invention.
FIG. 15 is a perspective view showing yet another configuration of the inductive loop antenna embodiment of the invention.

FIGS. 14 and 15 illustrate yet further embodiments of the system of this invention wherein inductive radio frequency coupling is used to detect and identify objects. In FIG. 14, the object 181 is a key tab having an attachment card 182 and an attachment lug 183 for attaching a key or other object to the card. A stem 184 depends from the attachment card 182 and has an interior bore 186 forming a socket in the depending stem 184. An RFID tag is attached to or embedded in the object and includes an integrated circuit chip 188 and inductive loop antenna 187 coupled thereto. The inductive loop antenna extends around the stem 184 in a spiral wrapped fashion surrounding the socket 186.

The stem 184 of the object 181 is inserted through an opening 189 in a top panel to replace the object in a storage unit. A backplane 191 is provided with a sensor post 192, which projects upwardly from the backplane 191 and is aligned with the receptacle 189. The sensor post 192 is provided with a sensor in the form of an inductive loop antenna 193 that wraps around the post and that is connected to other components of the system through traces 194. When the object 181 is inserted through the receptacle 189, the sensor post 192 is received in the socket 186 in such a way that the inductive loop antenna 193 of the sensor is disposed within and concentric with the inductive loop antenna 187 of the RFID tag. Communication between the system and the RFID tag is then possible as previously described. One advantage of the embodiment of FIG. 14 is that radio frequency electromagnetic fields can be concentrated by the multi turn concentrically disposed inductive loop antennas, making for more efficient coupling of RF signals.

FIG. 15 illustrates yet another embodiment of the same concept. Here, an object to be tracked has a depending stem 196 bearing an RFID tag having an integrated circuit 198 and an inductive loop antenna 197. The backplane of the system is provided with an inductive loop antenna unit 199 having a central opening 102. When the stem 196 of the object is inserted into a receptacle corresponding to a position in the storage unit, it is received through the opening 102 in the loop unit 199. Communication with the RFID tag then takes place as previously described.

Figure 16:
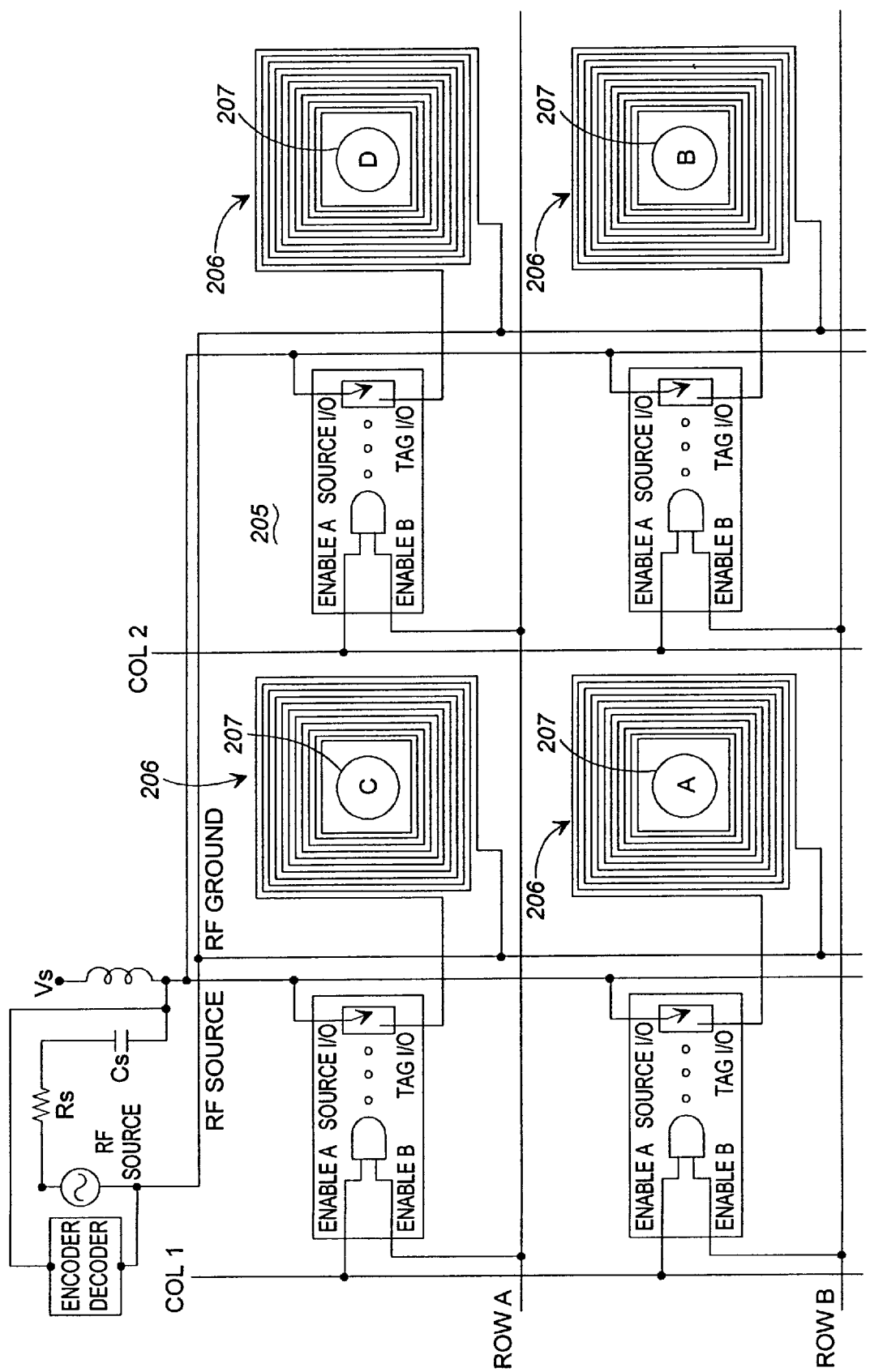
FIG. 16 is an electronic schematic diagram showing a preferred implementation of the inductive loop antenna embodiment on the backplane of a storage unit.
Figure 17:
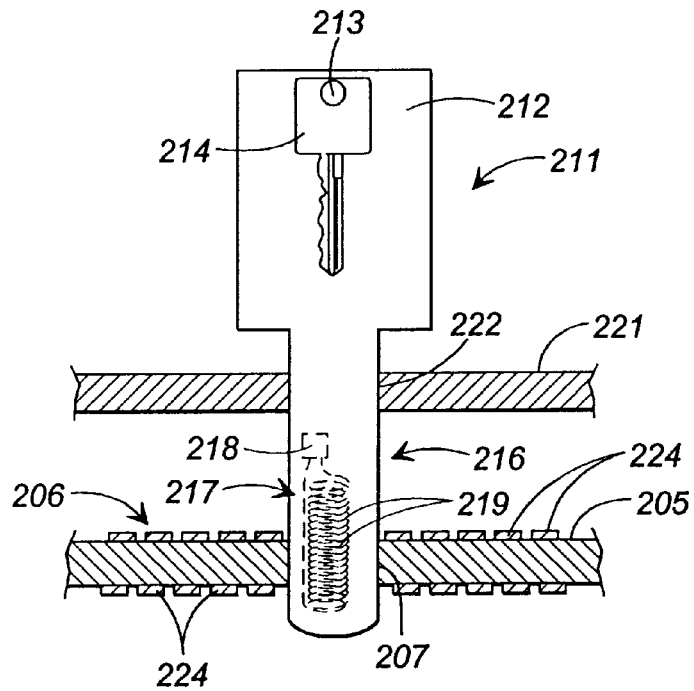
FIG. 17 is a cross-sectional view of a portion of a storage unit showing the inductive loop antenna embodiment of FIG. 16.

Another configuration of the inductively coupled object tracking system is shown in FIGS. 16 and 17. FIG. 16 illustrates the backplane of a storage unit with its various electronic components and with inductive loop antennas formed on the backplane by printed circuit board etching techniques. Specifically, each sensor location on the backplane has a corresponding inductive loop antenna trace 206 extending around a central opening 207 for receiving the stem of a object placed in the storage unit. With reference to FIG. 17, the stem 216 of such a unit is inserted through a receptacle 222 in a top panel 221 until its stem extends through the corresponding opening 207 in the backplane 205. The stem 216 is provided with an RFID tag comprising an integrated circuit chip 218 and an inductive loop antenna 217. When in position, the inductive loop antenna 217, having multiple turn inductive loops 219, is disposed in the center of the inductive loop traces 224 on the backplane 205. Preferably, inductive loop traces 224 are formed both on the top and bottom surface of the backplane to increase the radio frequency field strength. Communication with the RFID tag then takes place through inductive coupling as described above.

Figure 18:
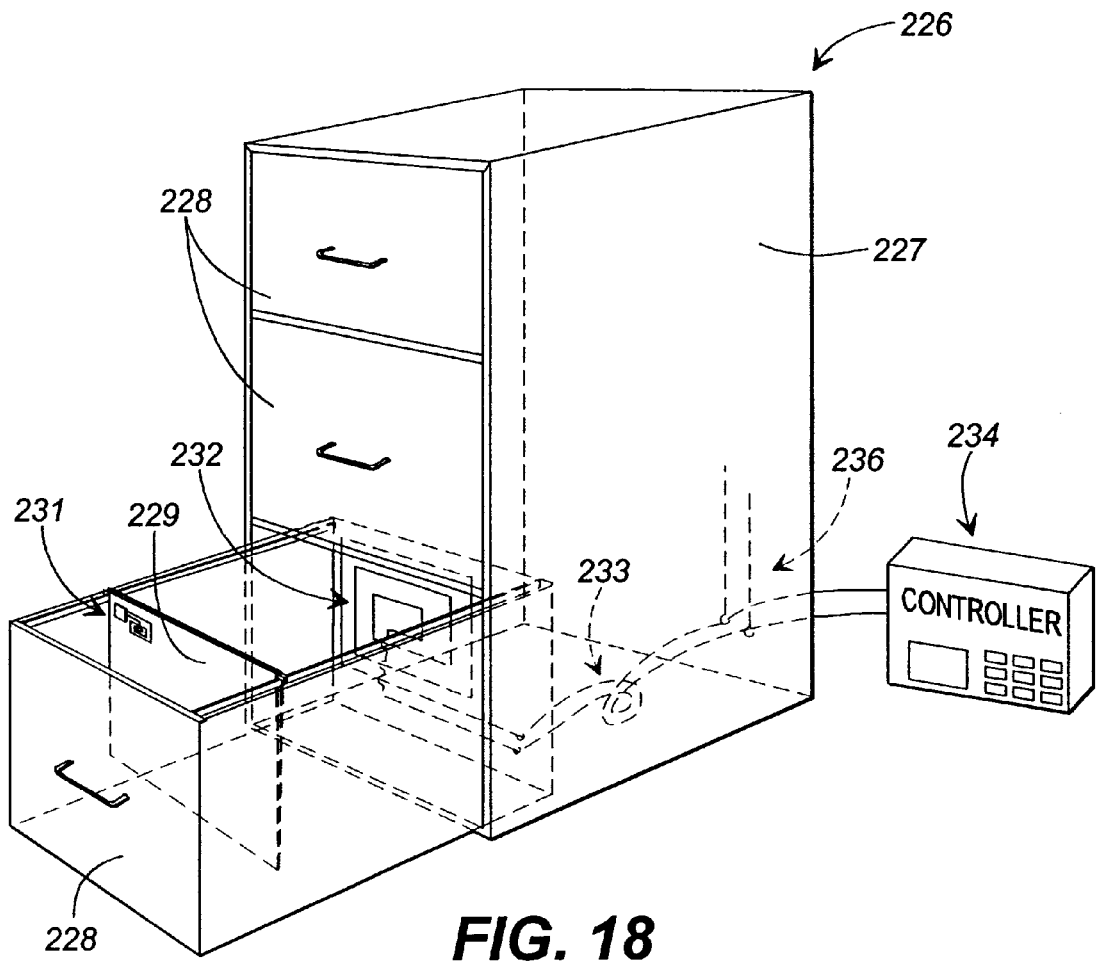
FIG. 18 is a perspective view illustrating an alternate application of the present invention for tracking file folders within a filing cabinet.

FIG. 18 illustrates an alternate application of the object tracking system of the present invention. In this application, the storage unit comprises a filing cabinet 226 having a case 227 and a plurality of drawers 228. The drawers are configured to carry file folders 229 in the usual way. Each of the file folders is provided with an RFID tag 231, which, in the illustrated embodiment, is an inductive RFID tag. An inductive loop antenna 232 is provided on the back of the drawer 228 and is connected through flexible cabling 233 to the controller 234, which contains the other electronic components described above. The other drawers of the filing cabinet 226 also are provided with antennae that are coupled to the controller 234 by means of a buss 236.

In use, the controller 234 sequentially polls the antennae 232 in the drawers of the filing cabinet (or in several filing cabinets if desired). When the antenna of each drawer is activated, the RFID tags of file folders 229 within the drawer are activated and transmit their unique codes to the antenna 232. The controller 234 then detects these codes and can determine from the codes received, which files are in the drawer. In addition, when polled rapidly such as, for example, several times per second, the controller can determine when files are removed from drawers, when they are replaced, and which drawer they are in when replaced. This information can be used in a variety of beneficial ways, including the elimination of structured filing systems, which can be cumbersome to maintain. With the object tracking system of the present invention applied to a filing cabinet, a user need only ask the controller where a file is located and the controller can indicated which drawer of which cabinet contains the file. If the file has been checked out by another individual, the controller can inform the user the identity of the person who has the file. These and other advantages of the application applied to a filing system are possible.

The invention has been described herein in terms of preferred embodiments and methodologies. More specifically, the invention has primarily been described in terms of a system for tracking keys or other small objects that can be attached to a key card or enclosed in a container. While these are preferred applications of the invention, it will be understood that the invention is fair from limited to the specific embodiments and applications discussed herein. Virtually any types of objects that need to be tracked can be tracked with the present invention as long as they can be provided with RFID tags and a storage receptacle for receiving the objects. Thus, a wide variety of additions, deletions, and modifications might well be made to the embodiments illustrated herein without departing from the spirit and scope of the invention as set forth in the claims.

What is claimed is:

1. An object tracking system for tracking the removal of objects from a storage unit and the replacement of the objects at a storage unit, said object tracking system comprising:

a panel disposed in said storage unit, said panel being formed with openings defining a plurality of receptacles for receiving objects to be tracked;

a backplane in said storage unit;

an ID tag attached to each of the objects to be tracked, each ID tag including electronic storage means carrying a stored code associated with the object corresponding to the ID tag, each of said ID tags transmitting its stored code when said ID tag is appropriately activated;

said plurality of receptacles in said panel being configured to receive objects when objects are replaced in said storage unit and to allow the objects to be selectively removed from the storage unit;

a sensor associated with each of said receptacles for activating the ID tag of an object in said receptacle and detecting the resulting transmission by the ID tag of the stored code associated with the object, said sensors being supported on said backplane;

selection circuitry coupled to said sensors for successively selecting said sensors, each sensor, when selected, detecting the stored code associated with an object if an object is present in the corresponding receptacle and detecting no code if an object is not present in the corresponding receptacle;

a controller coupled to said sensors for receiving stored codes detected by said sensors and for determining, based on the received codes, the absence of objects removed from the storage unit and the presence and location within the storage unit of objects present at the storage unit;

each of said ID tags comprising a radio frequency identification (RFID) tag, the stored codes of said RFID tags being transmitted through radio frequency transmission;

each of said RFID tags including an antenna for transmission of the stored code within the tag and each of said sensors including an antenna for receiving stored codes transmitted by RFID tags present in a corresponding one of said receptacles.

2. An object tracking system as claimed in claim 1 and wherein said antenna of each RFID tag comprises a pair of capacitive plates and wherein each of said sensors includes a pair of capacitive plates, said capacitive plates of each RFID tag aligning with said capacitive plates of a sensor when the object to which said RFID tag is attached is disposed in the receptacle associated with the sensor, the radio frequency transmission of said ID tag being capacitively coupled to said sensor.

3. An object tracking system as claimed in claim 2 and wherein said capacitive plates are formed of conducive foil.

4. An object tracking system as claimed in claim 2 and wherein said capacitive plates are formed of resistive ink.

5. An object tracking system as claimed in claim 2 and wherein said capacitive plates are applied to a surface of said object.

6. An object tracking system as claimed in claim 2 and wherein said capacitive plates are embedded within said object.

7. An object tracking system as claimed in claim 2 and wherein said capacitive plates of said sensors are mounted on said backplane.

8. An object tracking system as claimed in claim 7 and wherein the objects are relatively thin cards having a length, a width, and a face, said capacitive plates of each ID tag being substantially parallel with the face of its corresponding card and said capacitive plates of each sensor being formed on an upstanding daughter board affixed to said backplane.

9. An object tracking system as claimed in claim 8 and wherein said capacitive plates of each ID tag is disposed on the face of a corresponding card.

10. An object tracking system as claimed in claim 8 and wherein said capacitive plates of each ID tag are embedded within a corresponding card.

11. An object tracking system as claimed in claim 8 and wherein the capacitive plates of each ID tag are oriented along the width of the corresponding card and wherein the capacitive plates of said sensors are correspondingly oriented to align with the capacitive plates of said ID tags.

12. An object tracking system as claimed in claim 8 and wherein the capacitive plates of each ID tag are oriented along the length of the corresponding card and wherein the capacitive plates of said sensors are correspondingly oriented to align with the capacitive plates of said ID tags.

13. An object tracking system as claimed in claim 7 and wherein the objects are relatively thick and have a bottom end that is inserted in a selected receptacle when the object is placed in said storage unit, said capacitive plates of each ID tag being substantially parallel with the bottom end of the corresponding object and said capacitive plates of said sensors being formed on said backplane.

14. An object tracking system as claimed in claim 13 and wherein the objects are openable containers defining an interior space, the bottom ends of the objects have an interior surface and an exterior surface.

15. An object tracking system as claimed in claim 14 and wherein said capacitive plates of each ID tag are disposed on the interior surface of the bottom end of the corresponding openable container.

16. An object tracking system as claimed in claim 14 and wherein said capacitive plates of each ID tag are embedded within the bottom end of the corresponding openable container.

17. An object tracking system as claimed in claim 13 and wherein said backplane has a front surface facing said panel and a back surface facing away from said panel.

18. An object tracking system as claimed in claim 17 and wherein said capacitive plates of said sensors are formed on said front surface of said backplane.

19. An object tracking system as claimed in claim 17 and wherein said capacitive plates of said sensors are formed on said back surface of said backplane.

20. An object tracking system as claimed in claim 17 and wherein said capacitive plates of said sensors are formed by printed circuit tracings on said backplane.

21. An object tracking system as claimed in claim 1 and wherein said antenna of each RFID tag comprises an inductive loop and wherein each of said sensors includes an inductive loop, said inductive loops of each RFID tag being supported on said backplane and aligning with said inductive loop of a sensor when the object to which said RFID tag is attached is disposed in the receptacle associated with the sensor, the radio frequency transmission of said RFID tag being inductively coupled to said sensor.

22. An object tracking system as claimed in claim 21 and wherein the inductive loop of each RFID tag is received within the inductive loop of a sensor when the object to which the RFID tag is attached is inserted within the receptacle corresponding to said sensor.

23. An object tracking system as claimed in claim 21 and wherein the inductive loop of each sensor is received within the inductive loop of an RFID tag when the object to which the RFID tag is attached is inserted within the receptacle corresponding to said sensor.

24. An object tracking system as claimed in claim 21 and wherein the inductive loop of each RFID tag is juxtaposed the inductive loop of a sensor when the object to which the ID tag is attached is inserted within the receptacle corresponding to said sensor.

25. In an object tracking system wherein objects to be tracked are provided with ID tags storing codes identifying the objects and the codes of objects present at a location are read by a reader for determining the presence or absence of objects at the location, the improvement comprising a storage unit at the location, said storage unit including a panel formed with openings defining receptacles for receiving objects to be tracked and a backplane, said reader including detectors disposed on said backplane and associated with said receptacles, the stored codes being conveyed to the detectors through radio frequency transmission.

26. The improvement of claim 25 and wherein the radio frequency transmissions are conveyed to the reader by means of an antenna associated with each ID tag and at least one antenna associated with each of said detectors.

27. The improvement of claim 26 and wherein the antenna associated with each ID tag comprises a pair of capacitive plates and the antenna associated with each detector comprises a pair of capacitive plates positioned to align with the capacitive plates of the ID tag of an object disposed in the receptacle corresponding to the reader.

28. The improvement of claim 26 and wherein the antenna associated with each ID tag comprises an inductive loop and the antenna associated with each detector comprises an inductive loop positioned to align with the inductive loop of the ID tag of an object disposed in the receptacle corresponding to the detector.

29. An object tracking system for tracking the removal and replacement of objects at a location, said object tracking system comprising:

a storage unit;

a panel in said storage unit, said panel being formed with a plurality of openings defining receptacles for receiving objects replaced in said storage unit;

a backplane in said storage unit;

a plurality of radio frequency antennas on said backplane, associated with at least some of said receptacles;

a radio frequency identification (RFID) tag on at least some of the objects to be tracked; and a radio frequency antenna coupled to each RFID tag on objects to be tracked;

said radio frequency antenna on an object aligning with said radio frequency antenna associated with one of said receptacles when the object is replaced in said receptacle for radio frequency transmission of signals.

30. An object tracking system as claimed in claim 29 and wherein said radio frequency antenna on objects and on said backplane comprise capacitive plates.

31. An object tracking system as claimed in claim 29 and wherein said radio frequency antenna on objects and on said backplane comprise inductive coils.

* * * * *

UNITED STATES PATENT AND TRADEMARK OFFICE
CERTIFICATE OF CORRECTION

PATENT NO.    : 6,204,764 B1
DATED         : March 20, 2001
INVENTOR(S)   : William C. Maloney It is certified that error appears in the above-identified patent and that said Letters Patent is hereby corrected as shown below:

<u>Title page,</u>
Item [56], "References Cited" please insert the following:
                FOREIGN PATENT DOCUMENTS
WO 95/04324      02/1993     PCT
WO 95/12858      05/1995     PCT Signed and Sealed this Nineteenth Day of March, 2002

Attest:

JAMES E. ROGAN
*Director of the United States Patent and Trademark Office*

*Attesting Officer*